(12) United States Patent
Van Curen et al.

(10) Patent No.: US 11,000,013 B2
(45) Date of Patent: May 11, 2021

(54) ANIMAL TRAINING TRANSMITTER COMPRISING DETACHABLE FINGER BUTTON

(71) Applicant: E-Collar Technologies, Inc., Garrett, IN (US)

(72) Inventors: Greg Van Curen, Fremont, IN (US); Ho-Sung So, Seoul (KR); Bong-Ki Min, Gyeonggi-do (KR)

(73) Assignee: E-Collar Technologies, Inc., Garrett, IN (US)

( * ) Notice: Subject to any disclaimer, the term of this patent is extended or adjusted under 35 U.S.C. 154(b) by 614 days.

(21) Appl. No.: 15/949,160

(22) Filed: Apr. 10, 2018

(65) Prior Publication Data

US 2018/0368365 A1    Dec. 27, 2018

(30) Foreign Application Priority Data

Jun. 23, 2017   (KR) .................. 10-2017-0079437

(51) Int. Cl.
*A01K 15/00* (2006.01)
*A01K 15/02* (2006.01)
*A01K 27/00* (2006.01)

(52) U.S. Cl.
CPC .......... *A01K 15/021* (2013.01); *A01K 27/009* (2013.01)

(58) Field of Classification Search
CPC .......... A01K 15/00; A01K 15/021–023; A01K 15/02; A01K 15/029; A01K 27/00; A01K 27/009

USPC .......................................... 119/712, 718–721
See application file for complete search history.

(56) References Cited

U.S. PATENT DOCUMENTS

| | | | |
|---|---|---|---|
| 6,131,535 A | 10/2000 | So | |
| 2013/0197720 A1 | 8/2013 | Kraimer et al. | |
| 2013/0239904 A1 | 9/2013 | Kim et al. | |
| 2013/0239905 A1* | 9/2013 | Kim | A01K 15/023 119/720 |
| 2014/0060452 A1* | 3/2014 | Linssen | F41H 11/132 119/712 |
| 2015/0027383 A1* | 1/2015 | Richter | A01M 29/24 119/712 |

\* cited by examiner

*Primary Examiner* — Richard T Price, Jr.
(74) *Attorney, Agent, or Firm* — Taylor IP, P.C.

(57) ABSTRACT

Disclosed is an animal training transmitter according to an embodiment which communicates with an animal training receiver by wireless communication, the animal training receiver worn on an animal to deliver stimulation to the animal, the animal training transmitter including a finger inputter which is worn on a user's finger and including a button, and a transmitter body including a receiving portion and a button, the finger inputter being attachable to and detachable from the receiving portion, wherein the transmitter body is worn on the user's body, the finger inputter is connected to the transmitter body with a cable when detached from the receiving part, and the transmitter body transmits a stimulation delivery signal to the animal training receiver by wireless communication in response to the button of the finger inputter being pressed while connected with the cable.

7 Claims, 4 Drawing Sheets

ANIMAL TRAINING TRANSMITTER COMPRISING DETACHABLE FINGER BUTTON

TECHNICAL FIELD

The present disclosure relates to an electronic animal training system that is worn on the body of an animal such as a dog or a cat to deliver stimulation to train the animal or correct the animal's behavior.

BACKGROUND ART

In the field of animal training, owners or trainers (hereinafter referred to as 'users') have employed various electric and electronic technologies in correcting animal's behavior since the late 1960s. For example, Patent Literature 1 (U.S. Pat. No. 6,131,535) discloses an animal training system including a collar type animal training receiver and a handheld animal training transmitter possessed by a user that conducts radio-frequency wireless communications with the collar type animal training receiver, in which the user takes control to deliver animal stimulation such as electrical stimulation to the collar type animal training receiver through the animal training transmitter, for example, when a dog does a behavior needed to correct, such as, barking, going beyond a preset boundary or attacking a human.

Using such electronic animal training systems, animals (typically dogs, but animals may be other pets such as cats or livestocks) are trained to do good behaviors. Also, electronic animal training systems have advanced by employing electronic and communication technologies that are developing day by day, and are gaining excellent effects in training hunting dogs or pets.

Meanwhile, when a user trains an animal using the animal training system, it is general that the user holds the hand-held animal training transmitter in one hand, and manipulates, for example, presses buttons for delivering stimulation to the animal using the other hand's fingers. However, when the user holds the animal training transmitter in one hand and something (for example, a handgun for hunting) in the other hand or the user has impaired finger(s) or arm, the user has difficulty in using the general animal training system such as the above.

In this circumstance, Patent Literature 1 (US 2013/0239904) proposes an animal training transmitter including a transmitter body mounted around the back of the hand, and a control element that has only some buttons and is worn on a finger. When the user presses the button on the control element, the control element is configured to transmit a stimulation delivery signal corresponding to the button pressed by the user to a collar type animal training receiver worn on an animal through communication with the transmitter body by a wireless communication method such as Bluetooth.

However, because the control element disclosed by Patent Literature 1 communicates with the transmitter body by a wireless communication method, stimulation may not be delivered to the animal due to communication disconnect in a situation requiring urgent stimulation delivery to the animal. Furthermore, because the control element disclosed by Patent Literature 1 is a component that performs a fixed function, the transmitter body still has many buttons, and thus is large in size.

SUMMARY OF THE INVENTION

The present disclosure is directed to providing an animal training transmitter that transmits a stimulation delivery signal to an animal training receiver without communication disconnect even in the situation where one hand is busy or has limited motion, and has a reduced number of buttons.

There is provided an animal training transmitter according to an embodiment which communicates with an animal training receiver by wireless communication, the animal training receiver worn on an animal to deliver stimulation to the animal, the animal training transmitter including a finger inputter which is worn on a user's finger and including a button, and a transmitter body including a receiving portion and a button, the finger inputter being attachable to and detachable from the receiving portion, wherein the transmitter body is worn on the user's body, the finger inputter is connected to the transmitter body with a cable when detached from the receiving part, and the transmitter body transmits a stimulation delivery signal to the animal training receiver by wireless communication in response to the button of the finger inputter being pressed while connected with the cable.

When the finger inputter is attached to the receiving portion, the transmitter body may inactivate the button of the finger inputter and activate the button of the transmitter body, and when the finger inputter is detached from the receiving portion and is connected through the cable, the transmitter body may inactivate the button of the transmitter body and activate the button of the finger inputter.

Alternatively, when the finger inputter is attached to the receiving portion, the transmitter body may inactivate the button of the finger inputter and activate the button of the transmitter body, and when the finger inputter is detached from the receiving portion and is connected through the cable, the transmitter body may activate both the button of the transmitter body and the button of the finger inputter and allocate different functions.

In this instance, when the finger inputter is detached from the receiving portion and is connected through the cable, the transmitter body may activate the button of the transmitter body to deliver stimulation to a first animal and activate the button of the finger inputter to deliver stimulation to a second animal.

Alternatively, the transmitter body may allocate different functions to the button of the transmitter body and the button of the finger inputter irrespective of whether the finger inputter is attached or detached.

The transmitter body may determine if the finger inputter is attached or detached based on whether or not a contact terminal included in the receiving portion and a contact terminal included in the finger inputter are brought in contact.

When attaching the finger inputter to the receiving portion, the cable may be removed and the finger inputter may be connected to the receiving portion.

According to an embodiment, the transmitter body is connected to the finger inputter that can be attached to and detached from the transmitter body by wire, thereby preventing the communication disconnects caused by wireless communication and responding to an urgent situation quickly.

Furthermore, according to an embodiment, the function of the button provided in the finger inputter and/or the button provided in the transmitter body is selectively activated based on the state of connection between the finger inputter and the transmitter body, thereby reducing the number of buttons in the transmitter body.

DETAILED DESCRIPTION FOR CARRYING OUT THE INVENTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. The description proposed herein is just a preferable example for the purpose of illustrations only, not intended to limit the scope of the disclosure, so it should be understood that other equivalents and modifications could be made thereto at the time the present application was filed.

Figure 1:
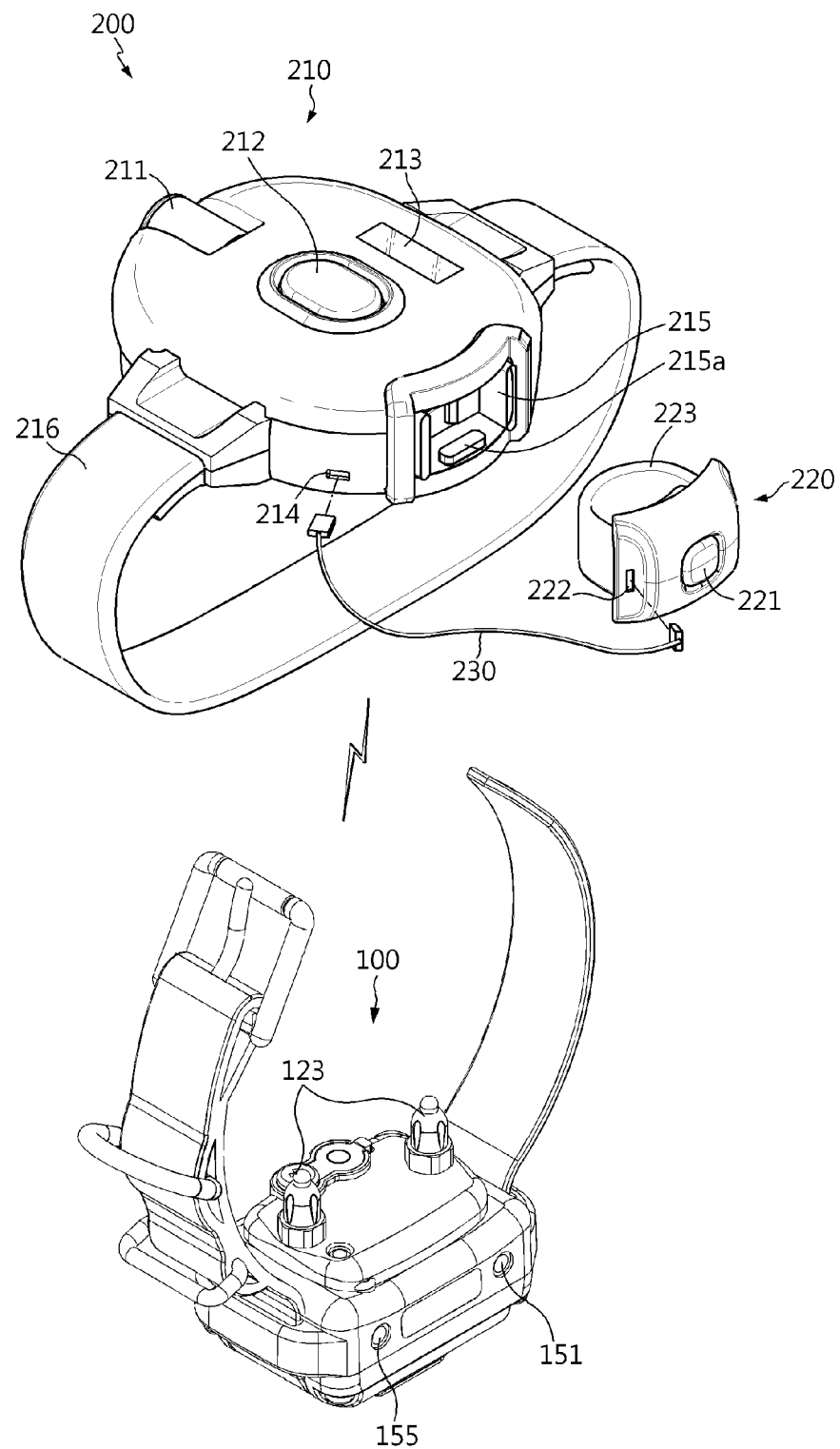
FIG. 1 is a perspective view showing an animal training system according to an embodiment of the present disclosure.

FIG. 1 is a perspective view showing an animal training system according to an embodiment of the present disclosure. Referring to FIG. 1, the animal training system of this embodiment includes an animal training receiver 100 worn on an animal to deliver stimulation for behavior modification to the animal when the animal does a behavior needed to correct, and an animal training transmitter 200 possessed by a user to control the animal training receiver 100. The animal training receiver 100 is configured to communicate with the animal training transmitter 200 via wireless communication, and operates under the control of the animal training transmitter 200.

The animal training receiver 100 of this embodiment shown in FIG. 1 is a common electronic animal training receiver used to train an animal (typically, a dog, but the present disclosure is not limited thereto) or correct the animal's behavior, and is typically worn on the neck of the animal. Accordingly, the animal training receiver 100 includes elements used for common animal training receivers, such as, a stimulation generation/delivery module, a microprocessor, a wireless communication module, a battery and a necessary sensor. The stimulation generation/delivery module includes stimulation means and its driver employed by common electronic animal training receivers, and the stimulation typically includes electrical stimulation, sound stimulation, vibration stimulation, and the like. A detailed configuration of the animal training receiver 100 is described below with reference to FIG. 2.

The animal training transmitter 200 of this embodiment shown in FIG. 1 is a remote controller worn by the user in the animal training system. As shown in FIG. 1, the animal training transmitter 100 includes a transmitter body 210 in the form of a watch that is worn on the user's wrist, a finger inputter 220 that can be attached to and detached from the transmitter body 210, and a cable 230 connecting the transmitter body 210 and the finger inputter 220 in a wired manner.

The transmitter body 210 includes a button 212, a dial 211 to tune the intensity or frequency of stimulation, a display 213 to display the state of the animal training transmitter 100, a receiving portion 215 to receive the finger inputter 220, a cable port 214, and a band 216.

The button 212 may include a power on/off function and a function for delivering stimulation to the animal, or a function to change the stimulation type. For example, the button 212 may power on or off when pressed for a predetermined time or longer, deliver stimulation to the animal when pressed for a short time, or change the stimulation or operation mode when pressed short successively a predetermined number of times. Furthermore, the button 212 may be allocated with functions based on whether the finger inputter 220 is attached to the transmitter body or not. When the user presses the button 212 to deliver stimulation to the animal, the transmitter body 210 may transmit a stimulation delivery signal to the animal training receiver 100 via wireless communication.

The dial 211 rotates by the user's manipulation to adjust the intensity or frequency of stimulation. The display 213 displays the state of the animal training transmitter 100. Here, the state may include the intensity or frequency of stimulation, power on/off, and the remaining battery amount.

The receiving portion 215 has a space in which the finger inputter 220 is received in the transmitter body 210. The receiving portion 215 has a shape corresponding to the shape of the finger inputter 220, and may include fixing means such as protrusion to provide a fixing force and give a feel of mount-in when the finger inputter 220 is mounted. The fixing means preferably provides a fixing force enough for the user to separate the finger inputter 222 with a small force. The finger inputter 220 may be inserted into the receiving portion 215 and thus connected to the transmitter body 210, or may be separated from the receiving portion 215. The receiving portion 215 has at least one contact terminal 215a that comes into contact with contact terminal installed in the finger inputter 220 when the finger inputter 220 is inserted. The cable port 214 may be connected to the cable 230 connected to the finger button 220, or the cable 230 for charging a battery embedded in the transmitter body 210. For the cable 230, a cable of USB standard may be taken as an example.

The band 216 is means that is worn around the user's wrist, may be fixed to the user's wrist using a ring and a ring pin, or may be fixed to the user's wrist in the Velcro type. However, the fixing method is not limited thereto, and the band may be fixed to the user's wrist by various method. Meanwhile, a holder (e.g., a receptacle) made of plastic may be installed in the middle of the band 216, and the transmitter body 210 may be attached to and detached from the holder. For example, the holder may be a magnetic material, and the transmitter body 210 also may include a magnetic material to allow the transmitter body 210 to attach to and detach from the holder. In addition to this, the transmitter body 210 may be attached to and detached from the holder with various structures. When needed, the user may take off the transmitter body 210 worn on the wrist like a watch and hold it in the hand, and press the button 212 of the transmitter body 210 to transmit a stimulation delivery signal to the animal training receiver 100.

As described above, the finger inputter 220 may be connected to the receiving portion 215 of the transmitter body 210 or separated from the receiving portion 215. When the finger inputter 220 is connected to the receiving portion 215, the finger inputter 220 plays a role of one button coupled with the transmitter body 210, and when the finger inputter 220 is separated from the receiving portion 215 and connected with the cable 230, the finger inputter 220 plays a role of a button extending from the transmitter body 210 in a wired manner. As shown in FIG. 1, the finger inputter 220 includes a button 221, a finger holder 223, and a cable port 222. The button 221 is input means that simply transmits an electrical press signal, such as a tact switch, and its function may be set by the transmitter body 210 based on whether the finger inputter 220 is attached to the transmitter body or not. For example, when the finger inputter 220 is separated from the transmitter body 210 and connected to the transmitter body 210 through the cable 230, the transmitter body 210 sets a purpose to the use for delivering stimulation to the animal by activating the button 221 of the finger inputter 220. Alternatively, when the finger inputter 220 is mounted in the transmitter body 210, the transmitter body 210 may inactivate the button 221 of the finger inputter 220 not to perform any operation even when the corresponding button 221 is pressed, or allocate a different function from the function of the button 212 of the transmitter body 210. For example, the button 212 of the transmitter body 210 may be used to deliver stimulation to a first animal, and the button 221 of the finger inputter 220 may be used to deliver stimulation to a second animal. The finger holder 223 may be a circular ring as shown in FIG. 1, but is not limited thereto, and is not limited to a particular shape if the shape allows insertion into the finger. The cable 230 is connected to the cable port 222.

Figure 2:
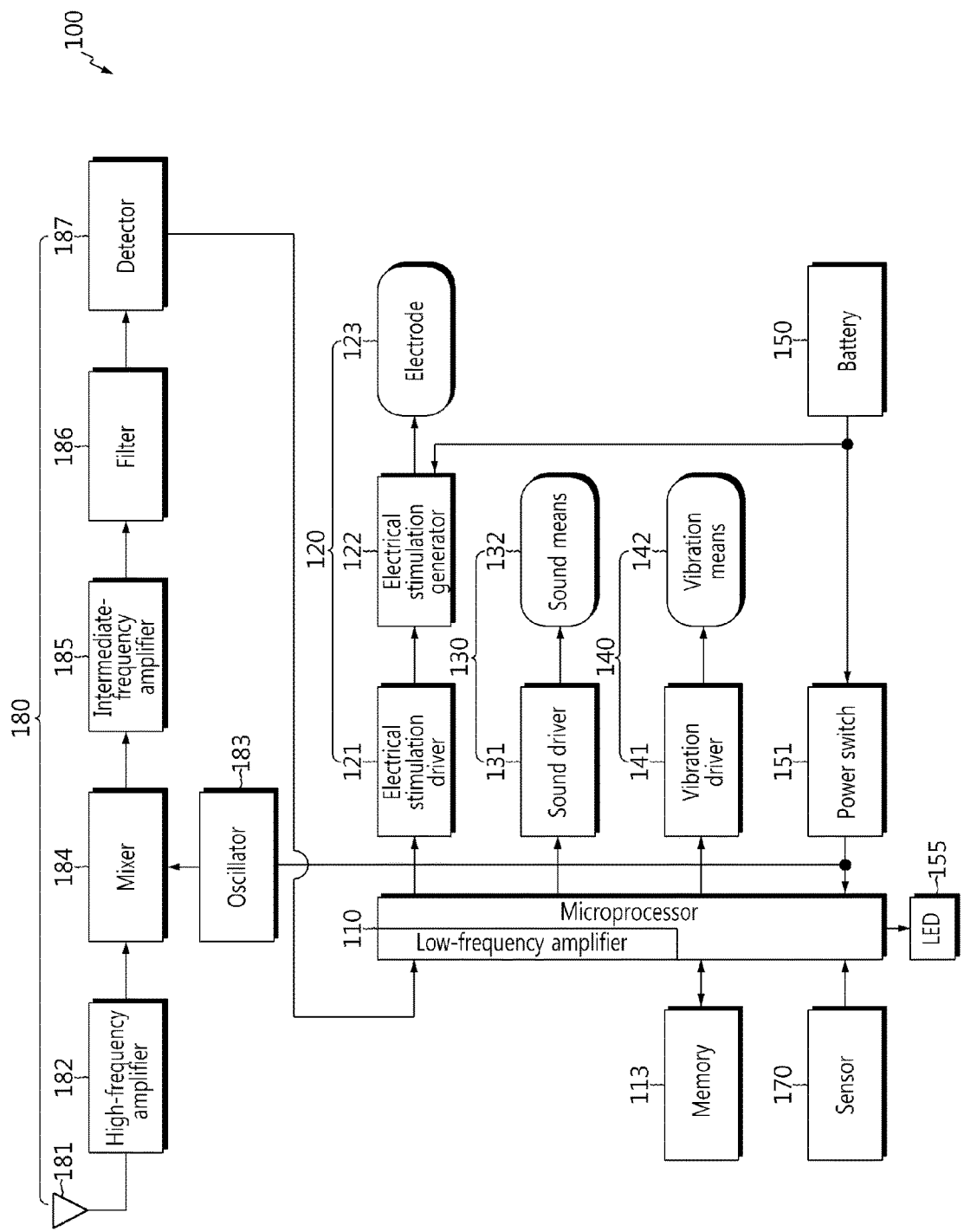
FIG. 2 is a block diagram showing the configuration of an animal training receiver according to an embodiment of the present disclosure.

FIG. 2 is a block diagram showing the configuration of the animal training receiver 100 according to an embodiment of the present disclosure.

Referring to FIG. 2, the animal training receiver 100 includes elements used for common animal training receivers such as a stimulation generation/delivery module, a microprocessor, a battery and a necessary sensor. The stimulation generation/delivery module includes stimulation means and its driver employed by common electronic animal training receivers, and the stimulation typically includes electrical stimulation, sound stimulation, vibration stimulation, and the like. The stimulation generation/delivery module for delivering electrical stimulation to the animal is implemented as an electrical stimulator generation/deliverer 120, and specifically, may include an electrical stimulation driver 121, an electrical stimulation generator 122, and an electrode 123.

The electrical stimulation driver 121 converts a signal of stimulation intensity indicated by the microprocessor 110 to an analog signal that can be recognized by the electrical stimulation generator 122 and outputs it to operate the electrical stimulation generator 122. The electrical stimulation generator 122 generates electrical pulse, for example, from 50 μA to about 100 mA in current and from 50V to about 10,000V in voltage using a transformer. The electrode 123 of FIGS. 1 and 2 is a stimulation terminal that comes into contact with the body (typically, neck) of the animal to deliver the electrical pulse generated by the electrical stimulation generator 122 to the animal. The microprocessor 110 may variously adjust the electrical stimulation delivered to the animal by adjusting the intensity (amplitude, voltage), frequency, duration (pulse width), interval, pulse ratio, duty cycle and repetition ratio of the electrical pulse through the electrical stimulation driver 121, although it varies depending on the detailed specification of the electrical stimulation generator 122.

The stimulation generation/delivery module for delivering sound stimulation to the animal is embodied as a sound stimulation generator/deliverer 130, and specifically, may include a sound driver 131 and sound means 132.

The sound driver 131 converts a signal of stimulation intensity indicated by the microprocessor 110 to a signal that can be recognized by the sound means 132 and outputs it to operate the sound means 132. The sound means 132 is implemented as a buzzer, a piezoelectric element, or a speaker to generate sound pulse with audible frequency to the animal. The microprocessor 110 may variously adjust sound stimulation delivered to the animal by adjusting the intensity (amplitude), frequency, duration (pulse width), interval, pulse ratio, duty cycle and repetition ratio of the sound pulse through the sound driver 131, although it varies depending on the detailed specification of the sound means 132.

The stimulation generation/delivery module for delivering vibration stimulation to the animal is embodied as a vibration stimulation generator/deliverer 140, and specifically, may include a vibration driver 141 and vibration means 142.

The vibration driver 141 converts a signal of stimulation intensity indicated by the microprocessor 110 to a signal that can be recognized by the vibration means 142 and outputs it to operate the vibration means 142. The vibration means 142 is implemented as a vibration motor or a piezoelectric element to generate vibration pulse. The microprocessor 110 may variously adjust the vibration stimulation delivered to the animal by adjusting the intensity (amplitude), frequency, duration (pulse width), interval, pulse ratio, duty cycle and repetition ratio of the vibration pulse through the vibration driver 141, although it varies depending on the detailed specification of the vibration means 142.

In addition to this, light from lighting means 155 such as a LED lamp may be used as the stimulation means or as a means of tracking the location of the animal training receiver 100 (means that is turned on at night so that the location of the animal (animal training receiver) can be easily perceived).

Meanwhile, each driver 121, 131, 141 and each stimulation generator/stimulation means 122, 132, 142 operated by the drivers are logically distinguished, and may be physically incorporated into one device.

A battery 150 supplies required power to each component of the animal training receiver 100, especially the microprocessor 110 and the stimulation generation/delivery modules 120, 130, 140, and preferably includes a rechargeable secondary battery.

A power switch 151 is a power switch which switches on/off the animal training receiver 100. Also, the animal training receiver 100 may be equipped with a regulator (not shown) connected to the power switch 151 to uniformly maintain the voltage of power supplied from the battery 150.

Although not shown in the drawing, the animal training receiver 100 also may include a display to display the remaining amount of the battery 150 or the type or mode of the stimulator means currently in operation.

Furthermore, although not essential, the animal training receiver 100 may include a sensor 170. The sensor 170 detects the animal's behavior such as barking and a motion, and may include various types of sensors based on a specific behavior intended to detect.

For example, when the animal training receiver 100 of the present disclosure is used as an animal behavior correcting apparatus which detects the animal barking, and to train the animal not to bark, delivers stimulation to the animal, the sensor 170 may be a piezoelectric sensor which detects vibrating of the vocal cords of the animals or a microphone which detects the animal barking.

Furthermore, when the animal training receiver 100 of the present disclosure is used as an animal behavior correcting apparatus which detects the animal going out of a preset area or approaching the area, and to train the animal not to do so, delivers stimulation to the animal, the sensor 170 may be a sensor that senses a signal (electromagnetic wave, ultrasonic wave, and infrared light) from a transmitter (a wire buried in the ground or a radio-frequency, ultrasonic or infrared transmitter installed at a point) installed at the area or its boundary, or an image sensor that senses a particular mark installed at the area or its boundary.

Further, the sensor 170 may be a gyro sensor or an acceleration sensor that detects a motion of the animal.

Furthermore, the animal training receiver 100 includes a wireless communication module 180. As shown in FIG. 2, the wireless communication module 180 includes an antenna 181, a radio-frequency amplifier 182, an oscillator 183, a mixer 184, an intermediate-frequency amplifier 185, a filter 186, and a detector 187. The antenna 181 receives a radio frequency (RF) signal transmitted from the animal training transmitter 200, and the radio-frequency amplifier 182 amplifies weak RF signal induced into the antenna 181. The oscillator 183 is a self-oscillator for obtaining second intermediate frequency, and a signal generated by the oscillator 183 is combined with the RF signal from the radio-frequency amplifier 182 by the mixer 184 into a second intermediate frequency signal. The intermediate-frequency amplifier 185 amplifies the intermediate frequency signal produced from the mixer 184, and the filter 186 filters out noise from the intermediate frequency signal produced from the mixer 184. The detector 187 detects operation signal and control signal such as ID codes sent from the animal training transmitter 200, and the detected control signal is inputted to the microprocessor 110 through a low-frequency amplifier.

Although not essential, the animal training receiver 100 of this embodiment may include a global positioning system (GPS) module or a two-way transmitter. The GPS module receives a signal from a satellite, and inputs location information of the animal to the microprocessor 110. The two-way transmitter transmits the location information of the animal or information associated with the animal training receiver 100 such as remaining amount information of the battery 150 to the animal training transmitter 200 through the antenna 181.

The microprocessor 110 receives an input of the control signal from the animal training transmitter 200 through the wireless communication module 180, and controls the operation of the animal training receiver 100 including the stimulation generation/delivery modules 120, 130, 140. That is, in this embodiment, the microprocessor 110 passively operates under the control of the animal training transmitter 200.

Meanwhile, when the animal training receiver 100 includes the sensor 170, the microprocessor 110 actively operates based on the signal from the sensor 170 to deliver stimulation to the animal. That is, the microprocessor 110 receives an input of signal from the sensor 170, and when a preset condition is satisfied (for example, the intensity of the signal from the sensor 170 exceeds a predefined reference value), the microprocessor 110 controls the stimulation generation/delivery module 120, 130, 140 to deliver stimulation to the animal. In this instance, when the intensity of the signal from the sensor 170 exceeds the predefined reference value, the microprocessor 110 may control the stimulation generation/delivery module 120, 130, 140 to deliver stimulation of a preset stimulation type, duration and/or intensity, and may be programmed to deliver stimulation with the type, duration and/or intensity of stimulation to deliver varying depending on the intensity of the signal from the sensor 170. However, the microprocessor 110 operates in an active operation mode under the control of the animal training transmitter 200 by the user.

The microprocessor 110 is typically implemented as an IC chip, and may have a necessary memory 113 or register, and the operation of the microprocessor 110 may be implemented as control logic programmed in software, firmware and hardwired logic.

Figure 3:
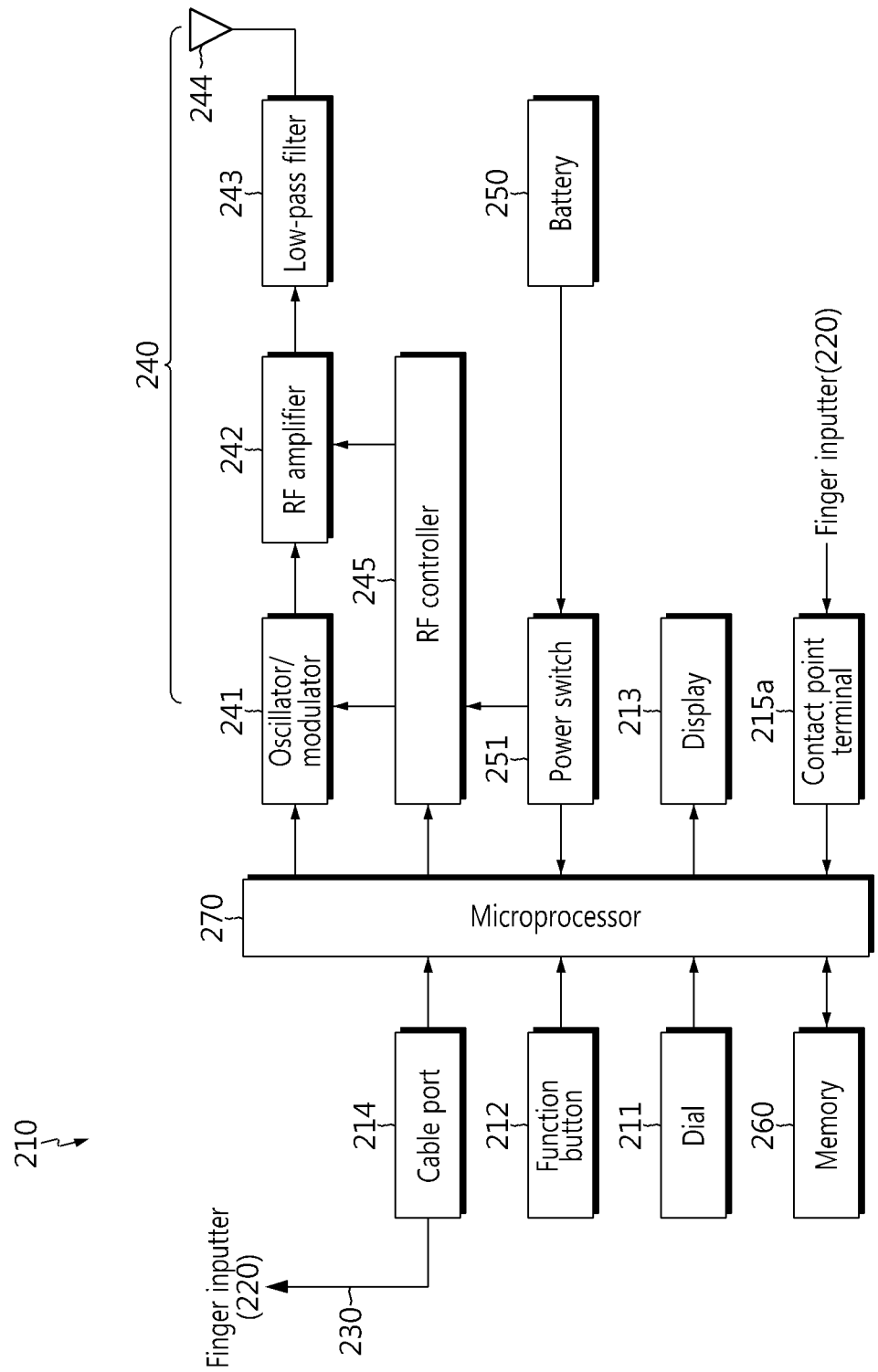
FIG. 3 is a block diagram showing the configuration of a transmitter body of an animal training transmitter according to an embodiment of the present disclosure.

FIG. 3 is a block diagram showing the configuration of the transmitter body 210 of the animal training transmitter 200 according to an embodiment of the present disclosure.

Referring to FIG. 3, the transmitter body 210 includes user input means to select a stimulation mode including the type, duration and/or intensity of stimulation to be delivered by the animal training receiver 100 or select functions provided by the animal training system and input an execution command, a wireless communication module 240 to transmit signals representing the stimulation mode or function selected by the user input means to the animal training receiver 100, a microprocessor 270 to process the signals and control the wireless communication module 240, a battery 250, and a power switch 251.

The user input means includes at least one button 212 or a switch 251 and a dial 211 to allow the user to set the type, intensity and duration of stimulation to be delivered to the animal through the animal training receiver 100. The dial 211 is a switch which adjusts the intensity or frequency of currently selected stimulation (electrical stimulation, sound stimulation, vibration stimulation, etc.). The type, duration, intensity and frequency of stimulation may be adjusted by a combination of one button 212 and the dial 211, or by the use of a plurality of buttons 212, the type of stimulation may be selected and an execution command may be inputted, or initialization, registration or setting change of the animal training transmitter 200 or the animal training receiver 100 may be carried out. Furthermore, when the user selects a particular stimulation mode to be delivered by the animal training receiver 100 or a particular function provided by the animal training system and commands with a voice, the user input means may include a microphone that inputs the voice. As described above, the animal training transmitter 200 may include the finger inputter 220 as the user input means, and the finger inputter 220 may be connected to the transmitter body 210 in a wired manner through the cable port 214 and the cable 230. Alternatively, the finger inputter 220 may be mounted in the receiving portion 215 of the transmitter body 210 and electrically connected to the contact terminal 215a of the receiving portion 215. To this end, the finger inputter 220 also has a contact terminal.

The wireless communication module 240 includes an oscillator/modulator 241, an RF amplifier 242, a low-pass filter 243, an antenna 244, and an RF controller 245. The oscillator/modulator 241 modulates a signal inputted from the microprocessor 270 based on a wireless communication method, and the RF amplifier 242 amplifies the RF signal from the oscillator/modulator 251. The low-pass filter 243 blocks harmonics other than the fundamental waves in the amplified RF signal, and the antenna 244 transmits the RF signal composed of the fundamental waves having passed through the low-pass filter 243. Furthermore, the RF controller 245 supplies power to operate the oscillator/modulator 241 and the RF amplifier 242 when a control signal needs to be transmitted to the animal training receiver 100 in response to an input from the user through the user input means of the animal training transmitter 200.

The battery 250 supplies required power to each component of the transmitter body 210 of the animal training transmitter 200, especially the microprocessor 270 and the wireless communication module 240, etc., and preferably includes a rechargeable secondary battery.

The power switch 251 is a switch which switches on/off of the transmitter body 210 of the animal training transmitter 200. The power switch 251 is a separately independent switch and may be provided in the transmitter body 210, or according to the embodiments, the button 212 may act as the power switch 251. For example, the button 212 may power on/off when pressed for a predetermined time or longer. Also, the transmitter body 210 of the animal training transmitter 200 may be equipped with a regulator (not shown) connected to the power switch to uniformly maintain the voltage of power supplied from the battery 250.

The transmitter body 210 of the animal training transmitter 200 of this embodiment may further include a display 213. The display 213 may display the type, intensity and frequency of stimulation selected/set by the user input means or the settings of the animal training transmitter 200 or the animal training receiver 100, and further, the remaining amount of the battery 250 of the animal training transmitter 200.

Although not essential, the transmitter body 210 of the animal training transmitter 200 of this embodiment may include a GPS module. The GPS module receives a signal from a satellite and displays location information of the user, i.e., the animal training transmitter on the display 213.

The microprocessor 270 controls the entire operation of the animal training system including the animal training receiver 100 and the animal training transmitter 200. The microprocessor 270 is typically implemented as an IC chip, and may have a necessary memory 260 or register, and the operation of the microprocessor 270 may be implemented as control logic programmed in software, firmware, and hard-wired logic.

Particularly, the microprocessor 270 may allocate the function of the buttons 212, 221 of the transmitter body 210 and/or the finger inputter 220 based on the connection of the finger inputter 220 and the transmitter body 210 and whether the finger inputter 220 is attached to the transmitter body 210 or not. That is, the button 221 of the finger inputter 220 is only a button coupled with the transmitter body 210 or a button extending from the transmitter body 210 in a wired manner, and the use of the button 221 is only designated by the microprocessor 270, and when the corresponding button 221 is pressed, the microprocessor 270 recognizes a press signal (e.g., an electrical signal) received through the cable port 214 or the contact terminal 215a, and performs its own pre-designated operation corresponding to the use.

In an embodiment, when the button 212 of the transmitter body 210 and the button 221 of the finger inputter 220 are for use to deliver stimulation to the animal, as the finger inputter 220 is connected to the transmitter body 210 through the cable port 214 and the cable 230, the microprocessor 270 activates both the two buttons 212, 221, recognizes a press signal no matter which of the buttons 212, 221 is pressed by the user, and transmits a stimulation delivery signal to the animal training receiver 100. Furthermore, when the finger inputter 220 is mounted (attached to) in the receiving portion 215 of the transmitter body 210, and the contact terminal of the finger inputter 220 and the contact terminal 215a of the receiving portion 215 are brought into contact, the microprocessor 270 recognizes that the finger inputter 220 is mounted, and inactivates the button 221 of the finger inputter 220 and activates the button 212 of the transmitter body 210. That is, when the button 221 of the finger inputter 220 is pressed by the user, the microprocessor 270 ignores the press signal, and transmits a stimulation delivery signal to the animal training receiver 100 only when the button 212 of the transmitter body 210 is pressed by the user.

In another embodiment, when the button 212 of the transmitter body 210 and the button 221 of the finger inputter 220 are for use to deliver stimulation to the animal, as the finger inputter 220 is connected to the transmitter body 210 through the cable port 214 and the cable 230, the microprocessor 270 inactivates the button 212 of the transmitter body 210 and only activates the button 221 of the finger inputter 220. That is, when the button 212 of the transmitter body 210 is pressed by the user, the microprocessor 270 ignores the press signal, and transmits a stimulation delivery signal to the animal training receiver 100 only when the button 221 of the finger inputter 220 is pressed by the user. Furthermore, when the finger inputter 220 is mounted in the receiving portion 215 of the transmitter body 210 and the contact terminal of the finger inputter 220 and the contact terminal 215a of the receiving portion 215 are brought into contact, the microprocessor 270 recognizes that the finger inputter 220 is mounted, and inactivates the button 221 of the finger inputter 220 and activates the button 212 of the transmitter body 210. That is, when the button 221 of the finger inputter 220 is pressed by the user, the microprocessor 270 ignores the press signal and transmits a stimulation delivery signal to the animal training receiver 100 only when the button 212 of the transmitter body 210 is pressed by the user.

In still another embodiment, when the finger inputter 220 is connected to the transmitter body 210 through the cable port 214 and the cable 230, the microprocessor 270 activates both the button 212 of the transmitter body 210 and the button 221 of the finger inputter 220 to perform the same function (for example, stimulation delivery) no matter which of the buttons is pressed. Furthermore, when the finger inputter 220 is mounted in the receiving portion 215 of the transmitter body 210 and the contact terminal of the finger inputter 220 and the contact terminal 215a of the receiving portion 215 are brought into contact, the microprocessor 270 recognizes that the finger inputter 220 is mounted, and activates both the button 212 of the transmitter body 210 and the button 221 of the finger inputter 220 and allocates different functions. For example, the button 212 of the transmitter body 210 may be used to deliver stimulation, and the button 221 of the finger inputter 220 may be used to change the stimulation type. Alternatively, the button 212 of the transmitter body 210 may be used to deliver stimulation to a first animal, and the button 221 of the finger inputter 220 may be used to deliver stimulation to a second animal. When the user raises a plurality of animals, a plurality of animal training receivers 100 worn on the plurality of animals may be individually controlled by one animal training transmitter 200. However, the present disclosure is not limited thereto, and various modifications may be made to the function allocation.

Meanwhile, the memory 260 stores programs that define the operation of the microprocessor 270 or data of the set conditions. Furthermore, each time the animal training receiver 100 is commanded to work through the animal training transmitter 200, the memory 260 may store a working history including the working time and the intensity of stimulation at that time. The user sees the stored working history through an external terminal such as a computer terminal or a smart phone, and thus the user can monitor when and how often the corresponding animal did behaviors needed to correct, if suitable behavior modification is being implemented, and if the stimulation mode such as the intensity of stimulation being currently set is proper.

In the foregoing embodiment, the user input means of the transmitter body 210, i.e., the function button 212, the dial 211 and the power switch 251 are placed on the side surface of the body of the transmitter body 210 or near the display 213 at the center of the body. In another embodiment, when the display 213 is implemented as a touch panel, the function button 212 or the dial 211 is not implemented as a physical button and may be implemented such that it is displayed on the display 213 and touched by the user.

Figure 4:
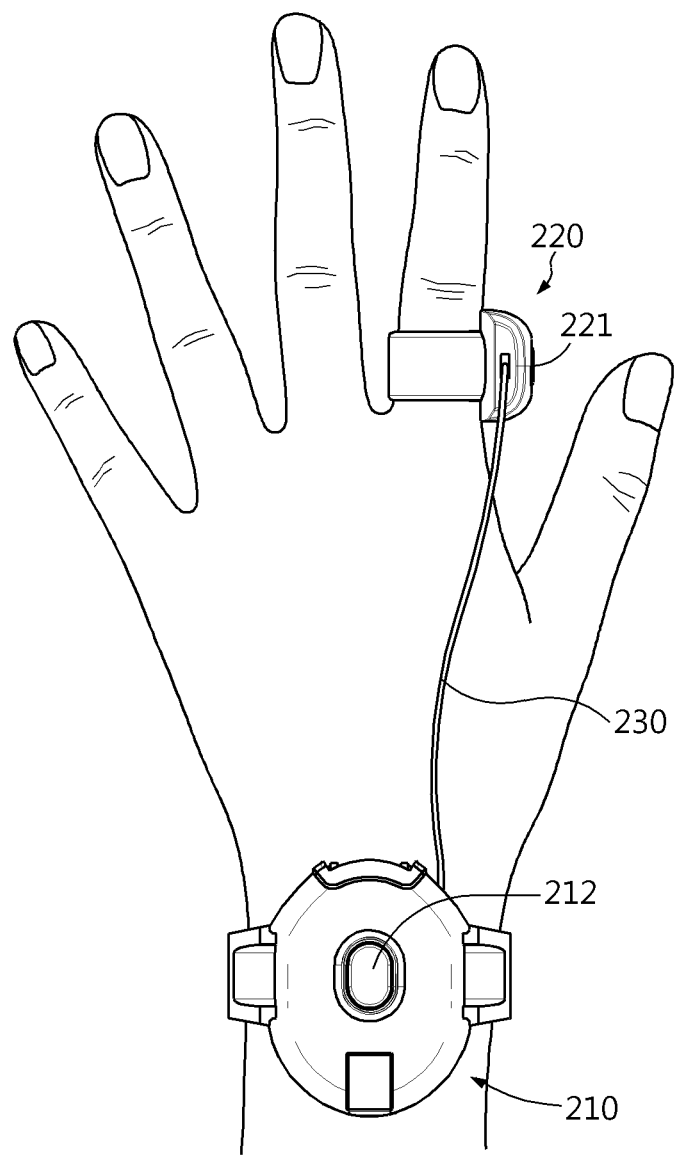
FIG. 4 is a diagram showing an animal training transmitter worn according to an embodiment of the present disclosure.

FIG. 4 is a diagram showing the animal training transmitter worn according to an embodiment of the present disclosure. Referring to FIG. 4, the user wears the watch type transmitter body 210 on the wrist, and separates the finger inputter 220 from the transmitter body 210 and wears the finger inputter 220 on the index finger. Furthermore, the finger inputter 220 is connected to the transmitter body 210 with the cable 230. Accordingly, in the case requiring urgent stimulation delivery to the animal, the user presses the button 221 of the finger inputter 220 worn on the index finger with the thumb. Accordingly, the transmitter body 210 transmits a stimulation delivery signal to the animal training receiver 100 via wireless communication. As described above, when the finger inputter 220 is worn on the index finger and the button 221 is pressed with the thumb, it is possible to deliver a stimulation delivery signal to the animal training receiver 100 with one hand. Furthermore, as opposed to the related art, the finger inputter 220 and the transmitter body 210 are connected with a wired cable, not via wireless communication, thereby preventing the failure to deliver stimulation due to communication disconnect in an urgent situation.

Hereinabove, the animal training system according to the present disclosure has been described. While the present disclosure has been described with regard to the embodiments, various modifications and changes may be made thereto by person having ordinary skill in the technical field to which the present disclosure belongs without departing from the technical aspects of the present disclosure. Therefore, the present disclosure should not be limited to the scope narrower than the scope of the appended claims.

What is claimed is:

1. An animal training transmitter which communicates with an animal training receiver by wireless communication, the animal training receiver worn on an animal to deliver stimulation to the animal, the animal training transmitter comprising:
   a finger inputter which is worn on a user's finger and including a button; and
   a transmitter body including a receiving portion and a button, the finger inputter being attachable to and detachable from the receiving portion, wherein the transmitter body is worn on the user's body, the finger inputter is connected to the transmitter body with a cable when detached from the receiving part, and the transmitter body transmits a stimulation delivery signal to the animal training receiver by wireless communication in response to the button of the finger inputter being pressed while connected with the cable.

2. The animal training transmitter according to claim 1, wherein the transmitter body inactivates the button of the finger inputter and activates the button of the transmitter body, when the finger inputter is attached to the receiving portion, and
   the transmitter body inactivates the button of the transmitter body and activates the button of the finger inputter, when the finger inputter is detached from the receiving portion and is connected through the cable.

3. The animal training transmitter according to claim 1, wherein the transmitter body inactivates the button of the finger inputter and activates the button of the transmitter body, when the finger inputter is attached to the receiving portion, and
   the transmitter body activates both the button of the transmitter body and the button of the finger inputter and allocates different functions, when the finger inputter is detached from the receiving portion and is connected through the cable.

4. The animal training transmitter according to claim 3, wherein the transmitter body activates the button of the transmitter body to deliver stimulation to a first animal and activates the button of the finger inputter to deliver stimulation to a second animal, when the finger inputter is detached from the receiving portion and is connected through the cable.

5. The animal training transmitter according to claim 1, wherein the transmitter body allocates different functions to the button of the transmitter body and the button of the finger inputter irrespective of whether the finger inputter is attached or detached.

6. The animal training transmitter according to claim 1, wherein the transmitter body determines if the finger inputter is attached or detached based on whether or not a contact terminal included in the receiving portion and a contact terminal included in the finger inputter are brought in contact.

7. The animal training transmitter according to claim 1, wherein when attaching the finger inputter to the receiving portion, the cable is removed and the finger inputter is attached to the receiving portion.

\* \* \* \* \*